June 12, 1934.  R. FERRIS  1,962,494
COFFEE MAKING APPARATUS
Filed Oct. 13, 1933  2 Sheets-Sheet 1

Inventor
ROBERT FERRIS
By Paul, Paul & Moore
ATTORNEYS

June 12, 1934.  R. FERRIS  1,962,494
COFFEE MAKING APPARATUS
Filed Oct. 13, 1933  2 Sheets-Sheet 2
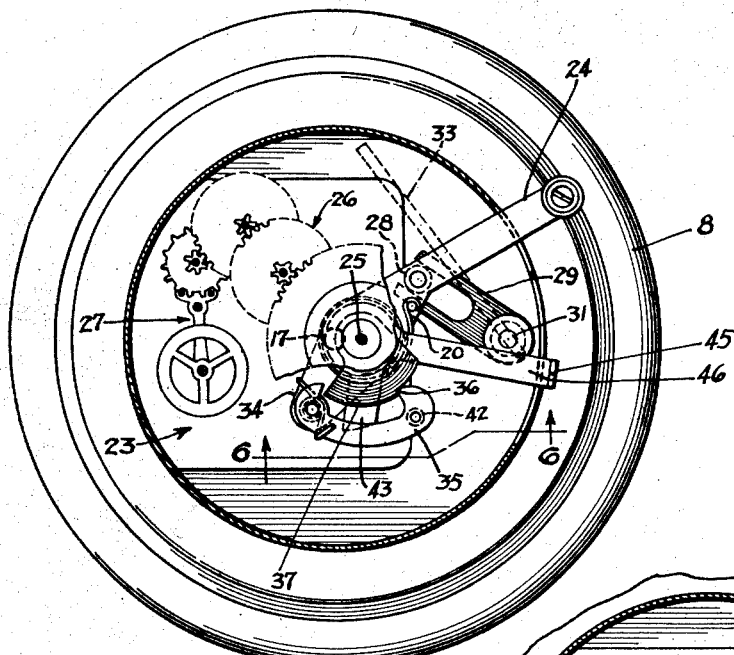
FIG. 3
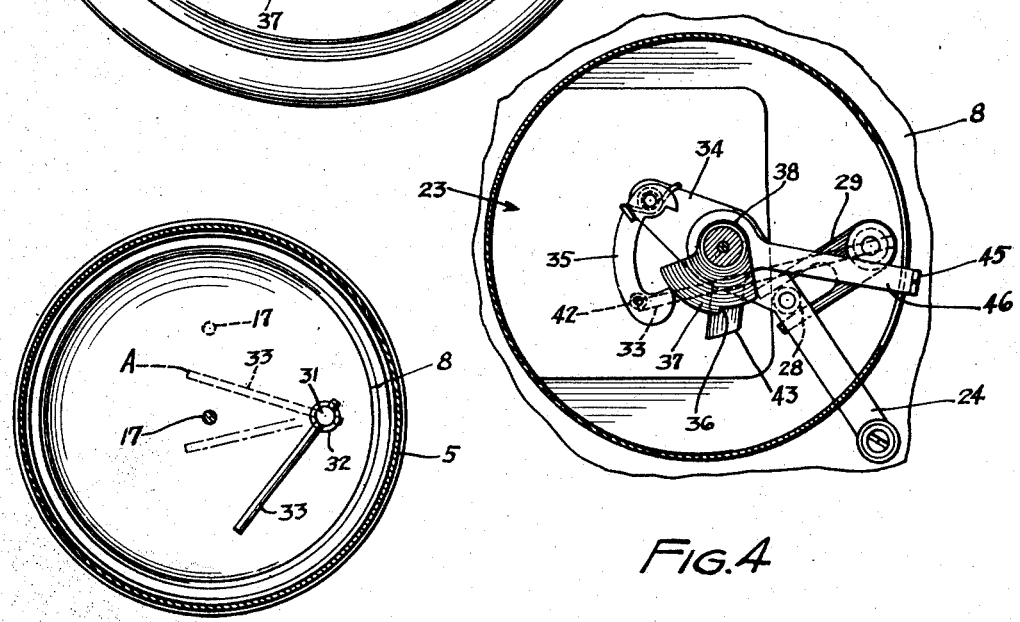
FIG. 4
FIG. 5
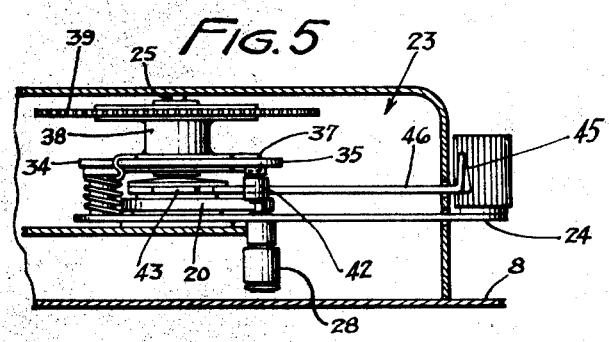
FIG. 6
Inventor
ROBERT FERRIS
By Paul, Paul &Moore
ATTORNEYS Patented June 12, 1934

1,962,494

UNITED STATES PATENT OFFICE 1,962,494

COFFEE MAKING APPARATUS

Robert Ferris, Minneapolis, Minn.

Application October 13, 1933, Serial No. 693,440

4 Claims. (Cl. 53—3)

This invention relates to new and useful improvements in coffee making apparatus, and more particularly to an apparatus of the character disclosed in my copending application, Serial No. 673,941, filed June 2, 1933.

An object of the present invention is to provide a container having a discharge opening and a valve for said opening, and a timing mechanism for automatically unseating the valve after a predetermined length of time, whereby the contents of the container may discharge therefrom.

A further object is to provide a coffee making apparatus comprising a receptacle having a container removably supported thereon and having a discharge opening provided with a suitable valve, and a timing mechanism being mounted on the container for automatically unseating said valve, after a predetermined length of time, whereby the steeped coffee in the container may discharge through said opening into the receptacle.

A further object is to provide a top for coffee pots which shall have associated therewith, a timing mechanism and an actuator operated by the timing mechanism, so that the steeped coffee will be discharged from the steeping container into a receptacle after a predetermined time.

A further object is to provide an automatic coffee making apparatus comprising a lower receptacle and a container adapted to be supported thereon, and said container having a discharge opening provided with a suitable valve having an operating stem, and a timing mechanism being mounted upon the cover of the container and provided with means adapted to automatically unseat said valve, after a predetermined length of time, whereby the steeped liquid coffee in the container may discharge therefrom into the lower receptacle.

Other objects of the invention reside in the means provided whereby the timing mechanism may be adjusted to vary the length of time the coffee is allowed to steep; in the novel arrangement of the timing mechanism upon the cover of the container whereby it becomes a component part thereof; in the improved construction of the plate-like member mounted in the lower portion of the container, and which cooperates with the walls thereof to provide means for filtering the steeped coffee in the container, as it discharges therefrom into the lower receptacle; in the means provided in the lower portion of the container for trapping small particles of coffee grounds or dross, which may escape through the filtering means; and, in the simple and inexpensive construction of the apparatus, whereby it may be manufactured at small cost.

Other objects of the invention will appear from the following description and accompanying drawings and will be pointed out in the annexed claims.

In the accompanying drawings there has been disclosed a structure designed to carry out the various objects of the invention, but it is to be understood that the invention is not confined to the exact features shown as various changes may be made within the scope of the claims which follow.

In the drawings:

Figure 3 is a sectional plan view on the line 3—3 of Figure 1, showing a suitable timing mechanism;

Figure 4 is a detail sectional view similar to Figure 3, showing the timing mechanism in its normal inoperative position;

Figure 5 is a sectional plan view on the line 5—5 of Figure 1, looking in the direction of the arrows; and Figure 6 is a detail sectional view on the line 6—6 of Figure 3.

Figure 1:
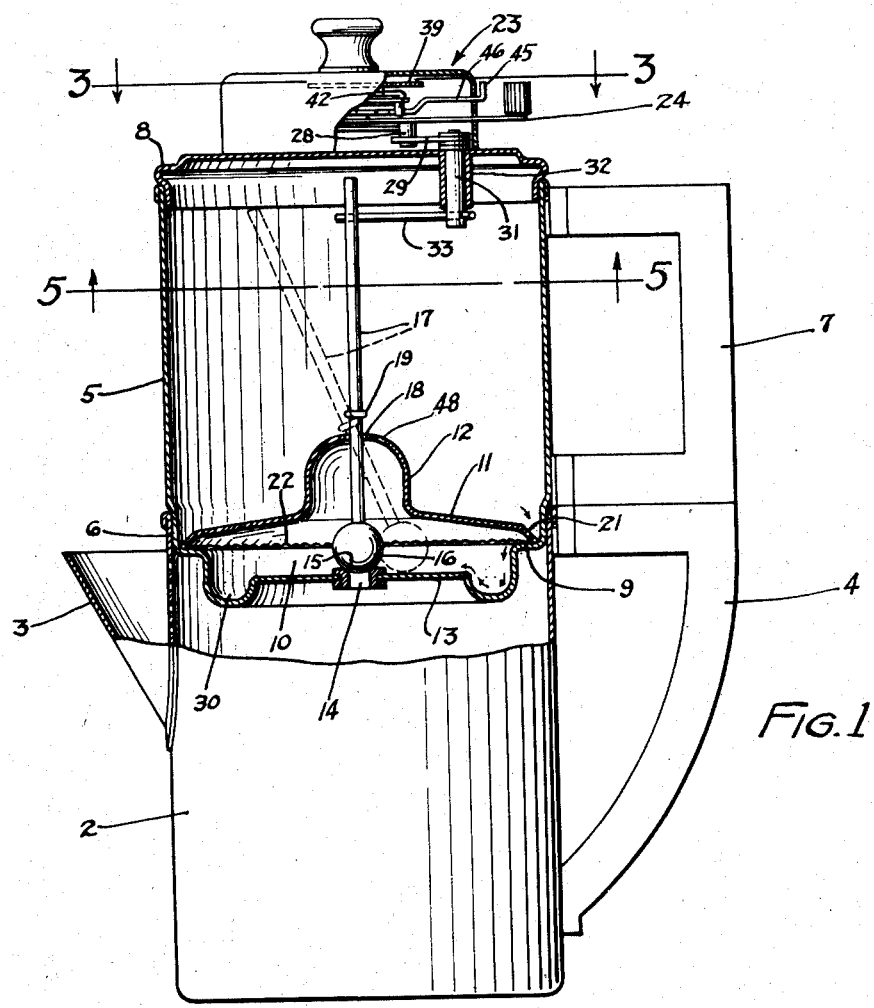
Figure 1 is a side elevation of my improved coffee making apparatus, partially in section, showing the timing mechanism arranged on the cover thereof.

In the selected embodiment of the invention here shown, there is illustrated in Figure 1, a coffee making apparatus comprising a lower receptacle 2 having an open top, and provided with a pouring spout 3 and a suitable handle 4. A container 5 is shown having a reduced portion 6 adapted to be fitted into the open top or mouth of the receptacle 2, whereby the container is removably supported thereon. The container 5 is provided with a suitable handle 7 and has a detachable cover or closure, generally indicated by the numeral 8.

A feature of the invention resides in the means provided in the lower portion of the container 5 for filtering the steeped coffee or other liquid discharged from the container into the receptacle 2. Such means is shown comprising a plate-like member, generally indicated by the numeral 11, and having a dome-shaped central portion 12. The marginal edge portion 21 of the member 11 may be bent downwardly, as shown in Figure 1, and is adapted to be supported upon a suitable support such as an annular seat or ledge 9, shown formed by contracting the lower portion of the wall of the container. The plate-like member 11 cooperates with the bottom wall 13 of the container to provide a chamber 10.

The bottom wall 13 of the container is imperforate, and has a discharge opening 14 provided with a valve seat 15, adapted to be engaged by a ball valve 16, whereby the discharge opening is closed. The valve 16 has a stem 17 supported in a guide opening 18 provided in the raised central portion 12 of the member 11, as best shown in Figure 1. A small collar 19 is shown secured to the valve stem 17 to prevent it from accidentally becoming detached from the member 11, when the latter is removed from the container. The guide opening 18 in the dome is spaced a considerable distance above the valve seat 15, whereby it acts as a fulcrum for the valve stem 17, when the latter is tilted to unseat the valve, as shown in Figure 1. The peripheral edge of the member 11 may be suitably notched or serrated, as shown at 22 in Figure 1, to permit the liquid in the container 5 to filter between the edge of said member 11 and the seat 9, when the valve 16 is unseated.

An annular recess 30 is provided in the bottom wall 13 adapted to trap and accummulate particles of ground coffee or dross which may escape into the chamber 10, when the valve 16 is unseated, and the liquid coffee in the container is filtering into said chamber, as indicated by the arrows in Figure 1, to be discharged therefrom into the receptacle 2 through the discharge opening 14.

Another important feature of this invention resides in the means provided for automatically unseating the valve 16, after a predetermined length of time, whereby the steeped coffee in the container 5 may discharge into the lower receptacle 2. Such a means is clearly shown in the drawings, and comprises a suitable timing mechanism, generally indicated by the numeral 23, which, in the present instance, is shown mounted upon the cover 8 of the container. This timing mechanism comprises an operating arm 24 mounted for oscillatory movement upon a shaft 25, as best shown in Figures 3 and 4. The arm 24 is operated in one direction by a suitable clock spring 20, having one end secured thereto and its other end suitably secured to a fixed support, not shown. A train of gears 26 is shown operatively connecting the shaft 25 to an escapement device, generally indicated by the numeral 27, and which controls or retards the return movement of the operating arm 24 in the usual manner.

The operating arm 24 is shown provided with a depending stud or roller 28, engaged with a forked arm 29 which is secured to the upper end of a shaft 31, mounted in a suitable bearing 32 provided in the upper wall of the cover 8. An actuating member 33 is secured to the lower end of the shaft 31 and is adapted, upon movement of the arm 24, to be actuated as indicated by the full and dotted lines in Figure 5, whereby it will engage the upper end portion of the valve stem 17 and tilt it to the inclined position indicated in dotted lines in Figure 1, thereby unseating the ball valve 16.

The arm 24 is shown having an extension 34 carrying a spring-actuated dog 35 adapted to engage a notch 36 provided upon a segment 37 secured to a hub 38. The hub 38 is suitably mounted for rotation in the frame of the timing mechanism, and carries a spur gear 39 which is operatively connected to the escapement mechanism by the train of gears 26, as shown in Figure 3. When the arm 24 is moved from the position shown in Figure 4 to that shown in Figure 3, the dog 35 will be actuated thereby and will move into engagement with the notch 36 provided in the segment 37 and, at the same time, the spring 20 will be wound to reset the timing mechanism. As the spring 20 unwinds, retarded by the action of the escapement 27, the dog 35 will slowly move the segment 37 from the position shown in Figure 3 to that shown in Figure 4, until a small roller 42 on the dog 35 engages an adjustable cam 43, which moves the dog out of the notch 36 of the segment 37, whereupon the operating arm will be suddenly returned to its normal inoperative position, shown in Figure 4 by the action of the spring 25, thereby swinging the actuating member 33 to the dotted line position A, shown in Figure 5, whereby the valve stem 17 will be actuated to open the valve 16.

The timing mechanism is shown provided with means for varying its operating period whereby the coffee may be allowed to steep for a longer or shorter time, as may be desired. The means for thus varying the operating period of the mechanism, is shown comprising a pointer 45 provided upon one end of an arm 46 to which the cam 43 is secured. Movement of the arm 46 changes the position of the cam 43 with respect to the travel of the roller 42 on the dog 35, whereby the timed travel of the operating arm 24 is varied. A suitable scale 47 may be provided upon the exterior of the casing or housing of the timing mechanism, as shown in Figure 2, to facilitate setting the pointer 45.

The timing mechanism herein disclosed, is of well-known construction and, specifically, forms no part of the present invention, and it is therefore thought unnecessary to further describe the same in detail. Any suitable timing mechanism applicable for the purpose may be used in lieu of the one illustrated, without departing from the scope of the invention.

In the operation of this novel coffee making apparatus, measured quantities of ground coffee and boiling water are introduced into the container 5, it being understood that when the apparatus is initially started, the valve 16 is closed, as shown in full lines in Figure 1. The cover 8 is then placed upon the container. When using the type of timing mechanism here shown, the operating lever 24 is operated to set the mechanism, after the cover has been seated upon the container. This follows because of the actuating member 33 swinging from the dotted line position A to the full line position in Figure 5, when setting the mechanism, which obviously would unseat the valve, if the cover were seated upon the container. It is to be understood, however, that other types of mechanisms may be used wherein the mechanism is set after the cover has been seated upon the container, without departing from the scope of the invention.

Figure 2:
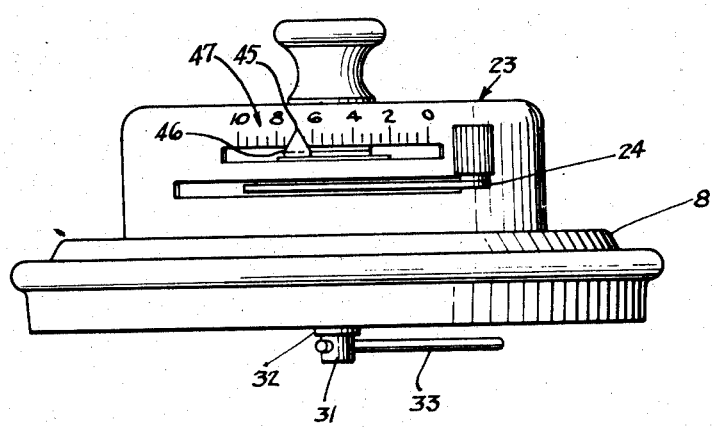
Figure 2 is a side elevation of the cover removed from the container, and showing a means for varying the operating period of the timing mechanism.

In Figure 2, it will be noted that the pointer 45 is positioned between the numerals 6 and 8 of the scale 47, whereby the mechanism will operate approximately seven minutes before the valve 16 is automatically opened. When the valve 16 is thus opened, the steeped liquid coffee in the container 5 will filter around the peripheral edge of the member 11 and into the valve chamber 10, from whence it will flow through the valve opening 14 into the receptacle 2, as will readily be understood by reference to Figure 1. The ground coffee will be retained upon the member 11 above the valve chamber. A suitable vent hole 48 is shown provided in the dome of the raised portion of the member 11 to permit the escape of air trapped in the valve chamber 10, when water is poured into the container.

From the foregoing, it will be noted that the opening of the valve 16 is entirely automatic. By relatively adjusting the position of the pointer 45, the effective operating period of the apparatus may be varied, whereby the resultant coffee will have the desired strength. If stronger coffee is desired, the pointer is adjusted towards the numeral 10 upon the scale 47, whereby the steeping period is correspondingly lengthened, and conversely, if weaker coffee is desired, the pointer is moved in the opposite direction, whereby the steeping period is correspondingly shortened.

The apparatus is very simple and inexpensive in construction and has proven very satisfactory in operation. The timing mechanism is preferably supported directly upon the cover of the container, as shown in Figure 1, and is so arranged thereon that, regardless of the relative rotative position of the cover upon the container, the actuating member 33 will always tilt the valve stem 17 to valve-opening position, when it eventually engages the stem 17 to unseat the valve. In the type of timing mechanism herein disclosed, the pointer 45 remains in fixed position if the same strength of coffee is desired each time that the apparatus is used. Thus, it will be seen that by the employment of this novel coffee making apparatus, if a measured quantity of a certain quality or brand of coffee is placed in the container 5 and mixed with a predetermined quantity of boiling water, the resultant coffee will always be substantially the same, from day to day, provided, of course, that the operating period of the timing mechanism is not readjusted or varied.

The improved filtering means provided in the bottom of the container 5, and the means provided for trapping particles of coffee grounds and other solids which may escape through the filtering means, assures that the resultant steeped coffee will be substantially clear and free from sediment.

While I have disclosed my timing mechanism in connection with a coffee pot of specific construction, it is obvious that the top and associated timing mechanism as a unit may be used with coffee pots of different construction, but wherein the coffee is to be steeped for a predetermined time in any suitable container and then automatically discharged into a receptacle.

I claim as my invention:

1. In coffee making apparatus of the type wherein the coffee is steeped in a container and then discharged through a valve controlled opening into a receptacle, a cover for said container, a time control mechanism carried by said cover, and means actuated by said mechanism for opening the valve controlling the opening between the container and receptacle after a predetermined time.

2. In coffee making apparatus of the type wherein the coffee is steeped in a container and then discharged through a valve controlled opening into a receptacle, a cover for said container, a time control mechanism carried by said cover, said time control mechanism having an actuating member adapted to project into said container for contacting and opening the valve controlling the opening between the container and receptacle after a predetermined time.

3. In coffee making apparatus of the type wherein the coffee is steeped in a container and then discharged through a valve controlled opening into a receptacle, a time control mechanism detachably connected to the container, and an actuating member associated with said time control mechanism for operating the valve controlling the opening between the container and receptacle after a predetermined time interval.

4. As a new article of manufacture, a coffee pot top having a time control mechanism associated therewith, said mechanism having an actuating member cooperating with means on the coffee pot on which it is adapted to be fitted, said mechanism being adapted to control the time of steeping the coffee, and the actuating member being adapted to cooperate with the means on the pot to discharge the coffee at the expiration of the steeping period.

ROBERT FERRIS.